United States Patent [19]

Marsh

[11] Patent Number: 4,894,877

[45] Date of Patent: Jan. 23, 1990

[54] MOBILE LOUNGE

[76] Inventor: William C. Marsh, P.O. Box 1509, Project City, Calif. 96079

[21] Appl. No.: 245,652

[22] Filed: Sep. 15, 1988

[51] Int. Cl.[4] ........................ A01G 7/00; A47C 17/64

[52] U.S. Cl. ............................................ 5/68; 5/111; 297/53; 297/338

[58] Field of Search ................... 5/111, 68, 66, 67, 69, 5/114; 297/338, 53, 54

[56] References Cited

U.S. PATENT DOCUMENTS

| | | | |
|---|---|---|---|
| 253,333 | 2/1982 | Armstrong | 297/53 |
| 1,203,572 | 11/1916 | Betts | 297/338 |
| 1,386,612 | 8/1921 | Farah | 297/54 |
| 2,994,093 | 8/1961 | Wagner | 5/68 |
| 3,359,576 | 12/1967 | Pile | 5/111 |
| 3,545,738 | 12/1970 | Stagg | 5/68 |

FOREIGN PATENT DOCUMENTS

| | | | |
|---|---|---|---|
| 644558 | 10/1950 | United Kingdom | 297/54 |

*Primary Examiner*—Alexander Grosz
*Attorney, Agent, or Firm*—Leonard D. Schappert

[57] ABSTRACT

A mobile lounge is provided consisting of a base frame having foldable legs attached thereto and a seat section and back section pivotally attached with respect to the base frame. The foldable legs, seat section and back section are all foldable against the base frame to form a compact unit for storage or transport.

4 Claims, 2 Drawing Sheets

MOBILE LOUNGE

BACKGROUND OF THE INVENTION

1. Field of the Invention

The present invention is related generally to medical devices designed to facilitate resting, more specifically to a lounge which may be utilized in treating individuals who are in shock, as well as individuals who have lost great amounts of blood, and more particularly to a mobile lounge which is portable in nature in the sense that it folds into a small, compact unit for transport or storage.

2. Description of the Prior Art

In the past, inventors have directed their efforts toward multiple devices designed to be utilized by medical personnel in the treatment of disabled individuals. Such devices have included gurneys which are easily raised and/or lowered, hospital beds which include adjustability for raising or lowering an individual's feet and/or head, mobile chairs having arms extending forward and/or backward to facilitate movement of an individual who has been disabled and stretchers designed to facilitate movement of individuals who have been injured. None of the prior art of which applicant is aware has taught a mobile lounge having the unique features as taught in the present invention.

SUMMARY OF THE INVENTION

The present invention consists of a mobile lounge having a frame to which legs are attached to form a base. The legs are pivotally attached to the frame and have locks to hold them in position. The legs may be folded up against the frame for storage and/or transport. The mobile lounge of the present invention further includes a seat section pivotally attached to the frame and a back section also pivotally attached to the frame. When the seat portion is positioned against the frame and the back section is positioned upright, an individual may sit in the mobile lounge in much the same way he sits in a chair. However, because both the seat section and the back section are pivotally attached to the frame, if an individual is in shock, the seat section may be raised and the back section lowered to allow the legs and feet of the individual to be raised. A support is provided to hold the seat section in position above the frame when the mobile lounge is utilized with individuals who are in shock or who have lost a great deal of blood. The mobile lounge further includes an arm rest which is positionable at either side of the mobile lounge. The arm rest detaches for storage, and the back section, being pivotally attached to the frame, folds forward to fit down against the seat section so that, when the seat section is positioned against the frame and the back section is folded forward against the seat section and the legs are folded against the bottom of the frame, the mobile lounge becomes a very compact, substantially rectangular package, thereby facilitating storage in a small area and easy transport. The mobile lounge also includes webbing material positioned on the back section and the seat section. The webbing material on the seat section includes quick attaching and detaching means to provide for its positioning on the seat section or removal therefrom for cleaning purposes.

One of the objects of the present invention is to provide a mobile lounge which can be effectively utilized in a hospital environment as well as in the field.

Another object of the present invention is to provide a mobile lounge which folds up into a very compact unit for storage and/or transport.

Another object of the present invention is to provide a mobile lounge which can be utilized to allow individuals to rest after losing blood.

A further object of the present invention is to provide a mobile lounge in which the back section is capable of lowering and the seat section is capable of being raised to facilitate effective treatment of individuals who are in shock.

Another object of the present invention is to provide an inexpensive and light-weight mobile lounge which is easily stored, easily set and easily transported.

The foregoing objects, as well as other objects and benefits of the present invention, are made more apparent by the descriptions and claims which follow.

DESCRIPTION OF THE PREFERRED EMBODIMENT

Figure 1:
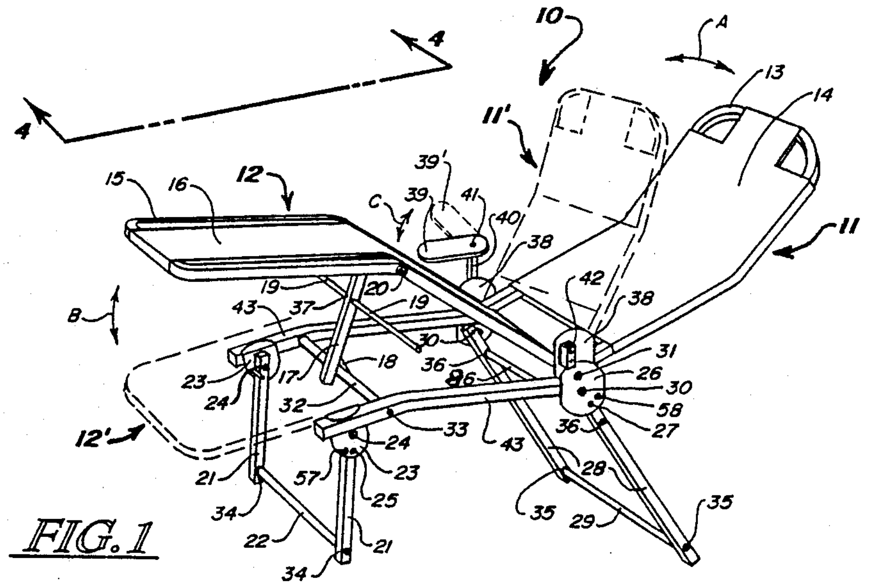
FIG. 1 is a perspective view of the mobile lounge of the present invention showing its structure and the movements involved in the use of the mobile lounge.

FIG. 1 of the drawings is a perspective view showing the structure and movement of the mobile lounge 10 of the present invention. Mobile lounge 10 has a base consisting of a frame 43 held together by brace 32. Braces 32 are attached at the end of frame 43 and a pair of legs 21 are pivotally attached at pivot points 24 to allow legs 21 to pivot with respect to frame 43. Stops 57 are provided to limit the movement of legs 21 with respect to frame 43, and locks 25 are provided to restrain legs 21 from folding against frame 43 until such is desired. Legs 21 are held together by brace 22, which is attached to them by attaching means 34 consisting of welding, bolts or any other acceptable attaching means. A second pair of legs 28 are attached to frame 43 by braces 26. Legs 28 are pivotally attached at pivot point 30 with respect to frame 43. A stop 58 is provided to limit movement of legs 28 with respect to frame 43, and a lock 27 is provided to prevent legs 28 from folding back against frame 43 until the appropriate time. The structure of locks 27 and 25 is shown in greater detail in FIG. 7 of the drawings. Seat section 12 and back section 11 are pivotally attached with respect to frame 43 to facilitate positioning thereof as shown in solid and/or dashed lines depending upon the use to which mobile lounge 10 is being put. Back section 11 consists of a frame 13 which is pivotally attached to braces 38 to facilitate movement as shown by arrow A. Frame 13 has a covering 14 consisting substantially of nylon webbing or other substantially equivalent support material capable of supporting an individual's back and head. The pivoting of frame 13 of back section 11 with respect to frame 43 is shown in greater detail in FIG. 2 of the drawings. Seat section 12 of mobile lounge 10 consists of a frame 15 with a covering material 16, consisting of nylon webbing or other substantially equivalent sufficiently flexible, strong material for supporting an individual's legs and buttock area. Frame 15 is pivotally attached with respect to frame 43 to facilitate movement as shown by arrow B. Seat section 12 is held in position as shown in solid lines by means of a support rod 17 which is pivotally attached to frame 15 by pivot means 20. A handle 19 is attached to support 17 by being extended through hole 37 therein so that a health worker can position support 17 properly to hold seat section 12 up as shown in solid lines. An extension 18 is rigidly attached to support 17 and rests against brace 32 to hold seat section 12 in position as shown in solid lines. Supports 42 are provided on braces 38 to facilitate positioning of an arm rest 39 thereon. Arm rest 39 is pivotally attached at pivot point 41 to leg 40 as shown. Leg 40 is positioned in support 42 to hold arm rest 39 in position. Braces 29 and 86 are provided to hold legs 28 with respect to each other. Brace 86 is attached to legs 28 by attaching means 36 such as a weld or bolt or other acceptable attaching means, and brace 29 is attached to legs 28 by means of attaching means 35 such as a weld or bolt or other acceptable attaching means.

Figure 2:
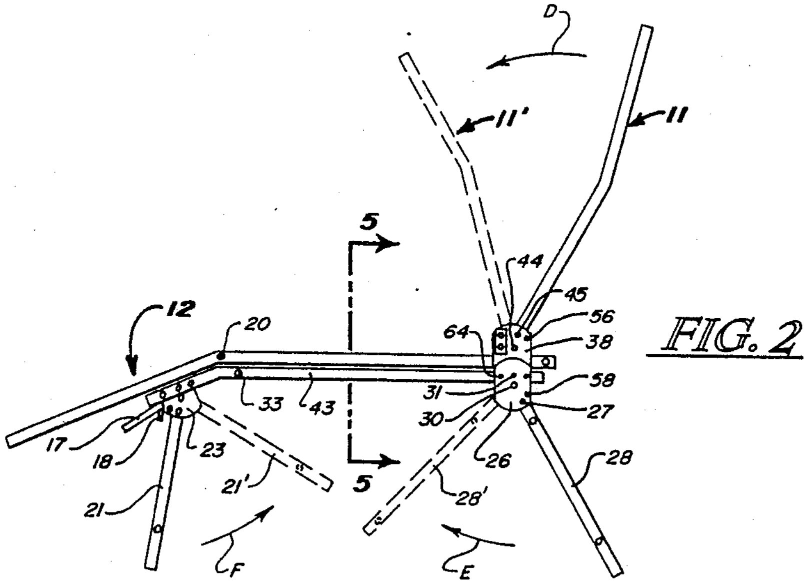
FIG. 2 is a side view of the mobile lounge of FIG. 1 showing movements involved in folding the mobile lounge.
Figure 3:
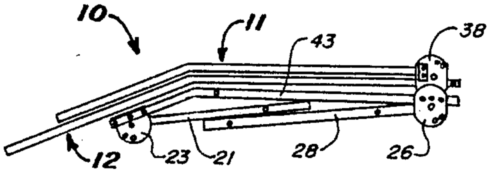
FIG. 3 is a side view of the mobile lounge of FIGS. 1 and 2 fully folded for storage and/or transport.

FIG. 2 is a side view of the mobile lounge of FIG. 1. Brace 38 is pivotally attached to brace 26 so that seat section 12 and back section 11 pivot into the position shown in solid lines in FIG. 1 as desired. When seat section 12 is positioned down against frame 43 as shown in solid lines in FIG. 2, back section 11 pivots on pivot means 44 with respect to brace 38 as shown by arrow D into the position shown in dashed lines as 11' and, finally, down against seat section 13. During use, back section 11 is held upright as shown in solid lines by a stop 56 which restrains it from going back farther with respect to brace 38. A lock 45 is provided which holds it back against stop 56 until one desires to fold it as shown by arrow D. Legs 21 and 28 also pivot with respect to frame 43 as shown by arrows E and F until they fit substantially flush against frame 43. The positioning of all the parts after legs 21 and 28, as well as back section 11, are folded against frame 43 is shown in FIG. 3. As shown in FIG. 3, the mobile lounge 10 folds into a very compact unit for storage and/or transport.

Figure 4:
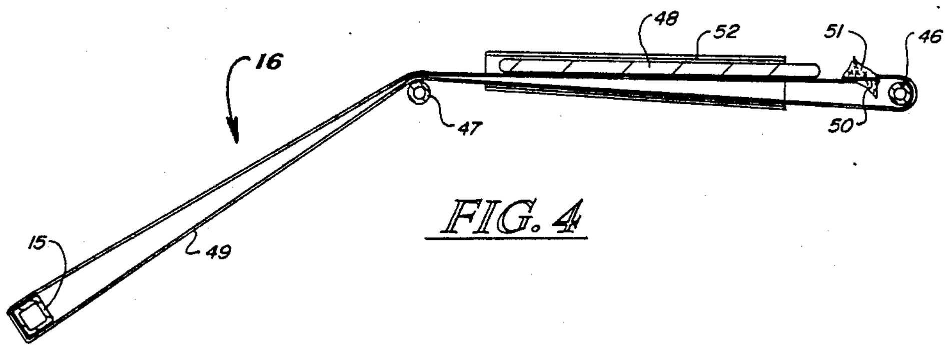
FIG. 4 is a cross-sectional view of the webbing material utilized in the seat section of the mobile lounge of FIG. 4 taken along lines 4—4 of FIG. 1.

FIG. 4 is a cross-sectional view of the covering 16 utilized with seat section 12 taken along lines 4—4 of FIG. 1. The covering 16 consists generally of nylon webbing or equivalent material 49 which extends over frame 15 of seat section 12 and over support rod 47, which is attached to frame 15 at point 20 as shown in FIG. 1. Covering 16 further extends around rod 46, which is attached with respect to frame 15 of seat section 12 at attaching point 64 as shown in FIG. 2. Thus, covering 16 provides a very strong base for an individual to sit on. The covering material 16 is held snugly by attaching means consisting of hook-and-loop type material 50 and 51, such as the ones sold under the Trademark of Velcro so that, as the covering material 16 loosens, it can be retightened. A pad 48 and further covering material consisting of webbing 52 was also included in the preferred embodiment to pad the area where an individual's buttocks normally sit. Its construction is shown in greater detail in FIG. 5.

Figure 5:
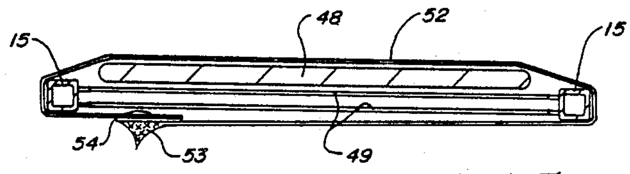
FIG. 5 is a cross-sectional view of the webbing material utilized in the seat section of the mobile lounge of FIGS. 1 and 2 taken along lines 5—5 of FIG. 2.

FIG. 5 is a cross-sectional view of the seat area of seat section 12 taken along lines 5-5 of FIG. 2 of the drawings. Webbing material 52 extends around frame 15 as here shown and holds pad 48 in position between webbing material 52 and covering 16 as shown. Webbing material 52 is held securely and snugly in position by a hook-and-loop-type fastener 53 and 54 such as the ones sold under the Trademark of Velcro.

Figure 6:
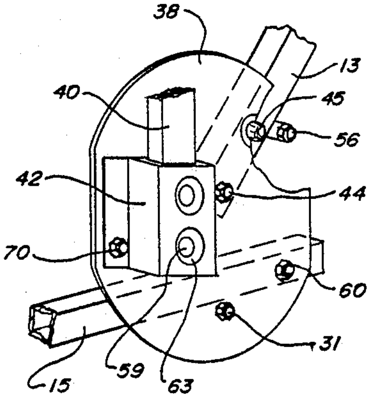
FIG. 6 is a perspective view of one of the braces utilized in assembling the mobile lounge of the present invention.

FIG. 6 is a perspective view showing the construction of brace 38 and associated parts. Stop 56 is positioned and substantially rigidly attached to brace 38 to limit how far frame 13 of back section 11 can move and lock 45 is provided to prevent frame 13 of back section 11 from folding forward until desired. Frame 13 of back section 11 is pivotally attached to brace 38 at pivot point 44 by pivot means such as a bolt, screw or pin or other acceptable pivot means. Frame 15 of seat section 12 is attached to brace 38 at point 60 by means of a bolt or other adequate attaching means, and brace 38 pivotally to brace 26 of FIGS. 1 and 2 of the drawings at pivot point 31 by pivot means such as a bolt, screw or pin or other acceptable attaching means, thereby allowing the entire seat section 12 and back section 11 to pivot with respect to frame 43 of the mobile lounge. A support 42 is attached to brace 38 by attaching means 70 such as a bolt, a screw, welding or other adequate attaching means to hold it in position with respect thereto. Support 42 is designed to accept leg 40 of arm rest 39 to hold arm rest 39 in position on either side of mobile lounge 10. It is held in position with respect to support 42 by means of a lock 59. Lock 59 is normally held in position in support 42 so that it extends out through hole 63 in support 42 to hold leg 40 in position with respect thereto.

Figure 7:
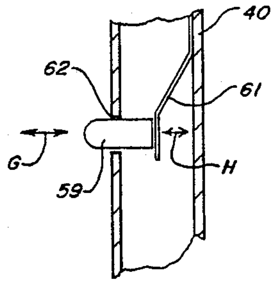
FIG. 7 is a cross-sectional view showing the structure of the lock utilized in positioning the legs of the present invention and the back section and seat section substantially rigidly with respect to the base frame of the mobile lounge.

FIG. 7 is a cross-sectional view of leg 40 showing the structure of lock 59. Notice that leg 40 has a hole 62 therein through which lock 59 extends. Lock 59 is attached to a spring 61 which is in turn attached to the interior of leg 40 so that, when lock 59 is pressed inward into leg 40, it springs back out to lock it in position into a hole through which it extends. All the locks which are discussed herein—specifically, locks 25, 27, 45 and 59—were constructed utilizing the same technique as shown in FIG. 7 for leg 40.

While the foregoing description of the invention has shown a preferred embodiment using specific terms, such description is presented for illustrative purposes only. It is applicant's intention that changes and variations may be made without departure from the spirit or scope of the following claims, and this disclosure is not intended to limit applicant's protection in any way.

I claim:

1. A mobile lounge, adapted to support a user of the lounge in various positions, including raised and lowered positions of the back and leg portions of the user, comprising:
   - a base frame having a front end and a back end;
   - a front leg pivotally attached with respect to said base frame near said front end of said base frame, foldable against said base frame;
   - a back leg pivotally attached with respect to said base frame near said back end of said base frame, foldable against said base frame;

a seat section, foldable against said base frame, of a sufficient size to support the buttocks and legs of a user, said seat section being pivotally connected to the base frame near the back end of the base frame, said seat section being raisable and lowerable relative to the base frame, said seat section including a support means adapted to cooperate with the base frame to hold the seat section in a raised position, and a back section foldable against the seat section, pivotally attached with respect to said base frame near said back end of said base frame the lounge being adapted to be folded into a compact configuration.

2. The invention of claim 1, including stop means which are provided to limit movement of said front and back legs with respect to said base frame.

3. The invention of claim 1, including locking means for locking said front and back legs into position with respect to said base frame.

4. The invention of claim 1, including locking means for locking said back section into position with respect to said seat section.

* * * * *